(12) United States Patent
Mondiguing et al.

(10) Patent No.: US 9,876,806 B2
(45) Date of Patent: Jan. 23, 2018

(54) BEHAVIORAL DETECTION OF MALWARE AGENTS

(71) Applicant: McAfee, LLC, Santa Clara, CA (US)

(72) Inventors: Stephen Mondiguing, Sunnyvale, CA (US); Benjamin Cruz, San Francisco, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/496,158

(22) Filed: Sep. 25, 2014

(65) Prior Publication Data

US 2016/0094569 A1    Mar. 31, 2016

(51) Int. Cl.
  *G06F 11/00* (2006.01)
  *H04L 29/06* (2006.01)
  *H04L 29/12* (2006.01)

(52) U.S. Cl.
  CPC ...... *H04L 63/1416* (2013.01); *H04L 61/1511* (2013.01); *H04L 2463/142* (2013.01); *H04L 2463/144* (2013.01)

(58) Field of Classification Search
  CPC .................................................. H04L 63/1416
  USPC .......................................................... 726/24
  See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,261,351 B1 * | 9/2012 | Thornewell | H04L 61/1511 709/203 |
| 8,347,394 B1 | 1/2013 | Lee | |
| 8,407,471 B1 * | 3/2013 | Sobel | H04L 61/1511 709/223 |
| 2006/0112176 A1 * | 5/2006 | Liu | H04L 29/12066 709/245 |
| 2007/0294419 A1 | 12/2007 | Ulevitch | |
| 2011/0320617 A1 | 12/2011 | Annamalaisami et al. | |
| 2012/0124372 A1 * | 5/2012 | Dilley | H04L 67/2819 713/162 |
| 2013/0014261 A1 | 1/2013 | Millliken et al. | |

(Continued)

FOREIGN PATENT DOCUMENTS

| | | |
|---|---|---|
| KR | 10-2003-0044526 A | 6/2003 |
| WO | WO 2016/048539 A1 | 3/2016 |

OTHER PUBLICATIONS

International Search Report and Written Opinion in International Application No. PCT/US2015/046820, dated Dec. 4, 2015, 11 pages.

*Primary Examiner* — Peter Shaw
(74) *Attorney, Agent, or Firm* — Patent Capital Group (57) ABSTRACT

In an example, a detection engine identifies potential malware objects according to behavior. In order to circumvent blacklists and fingerprint-based detection, a malware server may frequently change domain names, and change the fingerprints of distributed malware agents. A malware agent may perform only an initial DNS lookup, and thereafter communicate with the malware command-and-control server via "naked" HTTP packets using the raw IP address of the server. The detection engine identifies malware agents by this behavior. In one example, if an executable object makes repeated HTTP requests to an address after the DNS lookup "time to live" has expired, the object may be flagged as potential malware.

17 Claims, 4 Drawing Sheets

(56) References Cited

U.S. PATENT DOCUMENTS

2013/0085914 A1\* 4/2013 McPherson ......... H04L 61/1511
  705/34
2013/0179555 A1\* 7/2013 Neumann ............... H04L 69/28
  709/223

\* cited by examiner

BEHAVIORAL DETECTION OF MALWARE AGENTS

FIELD OF THE DISCLOSURE

This application relates to the field of computer security, and more particularly to behavioral detection of malware agents.

BACKGROUND

A malware agent is a malicious executable object that may be installed on an end-user's machine to misappropriate the machine's resources for use in a so-called "botnet" or for other malicious purposes. In one example, a botnet is a distributed network of "zombie" machines that each have a malware agent installed and that therefore respond to commands from a malware command-and-control (C&C) server. The C&C server may, in its turn, be programmed to perform any number of malicious functions. For example, the botnet may be configured to perform a denial of service (DoS) attack against a particular server. In another example, a botnet may be used to send out bulk email ("spam"). In yet another example, the botnet may be configured to perform distributed computing tasks for a malicious actor, such as mining of so-called "cryptocurrencies," attempting to break an encryption key by brute force, or otherwise performing malicious distributed actions.

When a computer has been misappropriated as a zombie on a botnet, various undesirable consequences may follow for the machine and for its users. For example, the botnet agent may misappropriate the users' own data on the zombie computer, misappropriate computing and network resources that are then unavailable for the users, or otherwise cost the user privacy, time, and money. The botnet agent may also attempt to self-propagate across other machines operating on the same network, which may cause enterprise security concerns. These negative effects of a botnet agent are provided by way of example only, and it should be recognized that other negative effects are possible when a network has been so compromised.

Other species of malware agents may also report to a C&C server, and may cause other types of harm.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

In an example, a detection engine identifies potential malware objects according to behavior. In order to circumvent blacklists and fingerprint-based detection, a malware server may frequently change domain names, and/or change the fingerprints of distributed malware agents. A malware agent may perform only an initial DNS lookup, and thereafter communicate with the malware command-and-control server via "naked" HTTP packets using the raw IP address of the server. The detection engine identifies malware agents by this behavior. In one example, if an executable object makes repeated HTTP requests to an address after the DNS lookup "time to live" has expired, the object may be flagged as potential malware.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

Because of the serious consequences of botnet agents and other malware agents discussed herein, it is desirable for an end user or enterprise security administrator to deploy security solutions that are configured to detect and mitigate malware attacks, and to deny resources to malware agents, such as for example a botnet agent operating on a zombie machine.

In certain existing security architectures, an anti-malware agent may be deployed to detect and mitigate malware, including botnet agents and other malware agents that connect to a C&C server. As used throughout this Specification, a "malware agent" refers specifically to any species of malware that reports to or communicates with a remote C&C server, unless otherwise specified.

Existing anti-malware solutions may rely on techniques such as blacklists of known C&C server domains, fingerprinting to identify known malware agents, malware testing to attempt to identify a malware agent's C&C server's IP address, and/or manual analysis to avoid false positives.

Certain embodiments of the foregoing solutions may be susceptible to counterattacks by malware authors. For example, a botnet C&C server may frequently change its domain name to avoid blacklists. In that case, the malware agent may make a DNS request to the last known good domain name immediately after being installed, and thereafter send naked HTTP traffic to that address. In this context, a "naked" HTTP packet is a packet that is sent directly to a raw IP address without an associated DNS lookup, or after the time-to-live (TTL) of an associated DNS lookup has expired. A standards-compliant executable object should not send such naked HTTP requests. Frequent or voluminous naked HTTP requests may thus be, at best, an indication that the software is not professionally developed and lacking in quality control. Such an executable object may be worthy at least of increased scrutiny, even if it is not deliberately malicious.

Malware authors may also frequently make subtle changes to malware agents, including renaming variables and recompiling to defeat fingerprinting-based approaches. Thus, with a combination of naked HTTP transactions, shifting domain names, and changing fingerprints, a wary malware author may be able to avoid easy detection by existing solutions.

However, there is disclosed in the present Specification a detection engine comprising hardware, software, and/or firmware operable for detecting and mitigating against malware agents, wherein the system and method are resistant to the foregoing methods.

In one example, a botnet agent attempts to defeat a security solution by sending naked HTTP requests so as to limit the number of DNS lookups that it performs to contact its C&C server. In this example, the malware author may frequently change the domain name of the C&C server, but keep the same static IP address. Thus, security solutions that rely on blacklisting of known bad domain names may be defeated with minimal effort. The botnet agent software may perform a single DNS lookup when it is first installed, and may thereafter use only naked HTTP transactions for as long as they continue to work. This enables the malware author to frequently change domain names without the need to provide frequent updates to its botnet agents. If it becomes necessary for the C&C server to change its IP address, the C&C server may then, in some cases, propagate to its malware agents information necessary to continue communication, such as the next "moving target" domain name. By thus minimizing DNS queries to suspect addresses, the malware author may better conceal the malware agent from easy detection.

However, it is recognized in this Specification that such behavior is detectable. Specifically, standards-compliant DNS requests have a "time to live" (TTL) field. TTLs may be set by an authoritative name server for a particular domain name. When a caching (recursive) nameserver queries the authoritative nameserver for a resource such as a domain name, it should cache the record for the designated time, which may be specified in seconds.

In its turn a "stub resolver" may query the caching nameserver. If the TTL has not yet expired, the caching nameserver will simply return the cached value. This reduces the load on an authoritative nameserver.

A typical TTL may be specified in seconds, and a common TTL value is 86,400 seconds, corresponding to 24 hours. In some special cases, TTL may be set lower, such as 300 seconds (5 minutes), and in the general sense, any arbitrary value may be used.

A properly-functioning network socket should not continue to send naked HTTP requests after the TTL expires. Rather, it should perform a new DNS query to refresh the IP address. However, compliance with this standard is essentially voluntary; although a properly-functioning and nonmalicious program should honor the TTL, there is no guaranty that it always will. Thus, when an executable object performing network operations ignores the TTL, it may be inferred that the executable object is either malicious or at best not functioning properly.

In one example of the present Specification, a detection engine is configured to detect such behavior and determine whether it is likely that the behavior is the result of a malware agent. For example, in one embodiment a detection agent monitors both incoming and outgoing traffic. The agent may first determine whether traffic is either DNS traffic or HTTP traffic. If it is neither, then in one embodiment the traffic may safely be ignored. However, if it is DNS traffic, then relevant data are extracted from DNS requests, Including the TTL value. For HTTP traffic, the detection agent may determine whether there is a previous DNS request associated with the address, and whether the TTL on that DNS request has expired. If the TTL has expired and the parent process is still sending naked HTTP requests to the address, the packet and its parent process (in other words, the process or other executable object that originates the packet) may be marked as either suspicious or as malware.

In one embodiment, a single instance of a naked HTTP request may be considered an anomaly or a minor bug. However, as the number of naked packets increases, the probability that the originating process is malware increases. Conversely, if the underlying process is not malware, this non-standards-compliant behavior at least indicates that the software is probably not professionally developed or mission critical. Thus, it is not necessary to determine with perfect confidence that a packet and its parent process are malware. Rather, the balance of probability may weigh in favor of designating the packet and its parent process as either suspicious or malware. Once a packet or its parent process have been designated as malware, the detection engine may take remediative action against the parent process. This action may include, for example, quarantining, mitigating, segregating, reporting, blocking, deleting, or otherwise acting on the parent process. Remediative action may also include dropping network packets from the parent process, or directing network packets into a sandbox environment.

Recognizing that it is possible that a mission-critical application could hypothetically send naked HTTP requests, it is also useful to provide a facility for a user or security administrator to whitelist a particular executable object. In that case, the executable object may be permitted to function unhindered despite its malware-like behavior.

The detection engine described herein may be, in certain embodiments, a standalone security solution. In other embodiments, it may be part of a larger and more comprehensive security architecture, including one or more firewalls, antivirus agents, antimalware agents, anti-adware agents, privacy guards, and botnet detection agents configured with blacklisting and fingerprinting capabilities.

A detection engine and associated systems and methods will now be discussed with more particular reference to the attached FIGURES.

Figure 1:
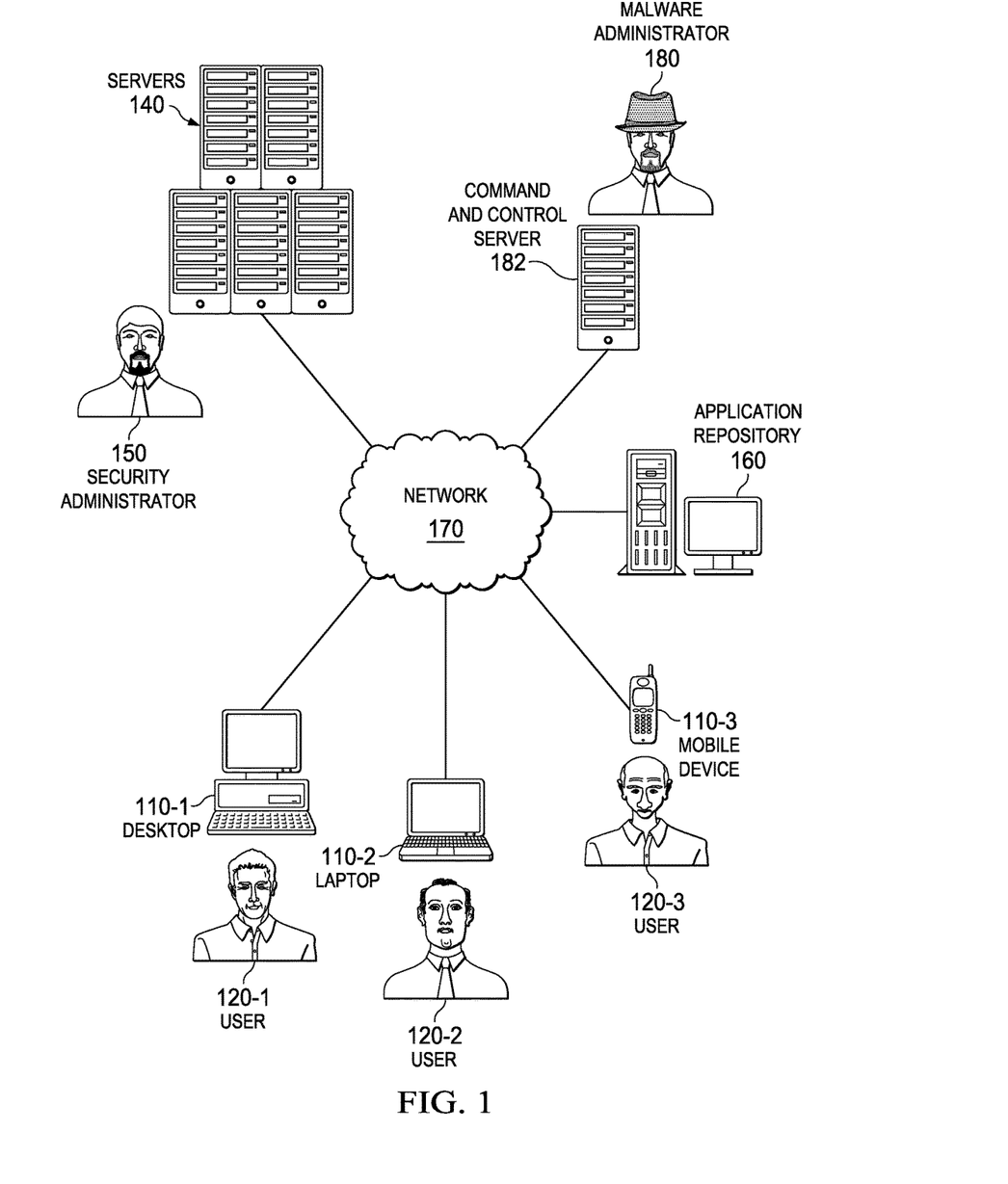
FIG. 1 is a block diagram of a security-enabled network according to one or more examples of the present Specification.

FIG. 1 is a network-level diagram of a distributed security network 100 according to one or more examples of the present Specification. In the example of FIG. 1, a plurality of users 120 operate a plurality of computing devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in some cases may also be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Computing devices 110 may be communicatively coupled to one another and to other network resources via network 170. Network 170 may be any suitable network or combination of networks, including for example, a local area network, a wide area network, a wireless network, a cellular network, or the Internet by way of nonlimiting example. In this illustration, network 170 is shown as a single network for simplicity, but in some embodiments, network 170 may include a large number of networks, such as one or more enterprise intranets connected to the internet.

Also connected to network 170 are one or more servers 140 (one or more of which may be a security server), an application repository 160, and human actors connecting through various devices, including for example an malware administrator 180. Servers 140 may be configured to provide suitable network services including certain services disclosed in one or more examples of the present Specification. In one embodiment, servers 140 and at least a part of network 170 are administered by one or more security administrators 150.

It may be a goal of users 120 to successfully operate their respective computing devices 110 without interference from malware administrator 180.

In one example, malware administrator 180 has a goal or purpose to cause malicious harm or mischief. The malicious harm or mischief may take the form of installing root kits or other malware on computing devices 110 to tamper with the system, installing spyware or adware to collect personal and commercial data, defacing websites, operating a botnet such as a spam server, or simply to annoy and harass users 120. Thus, one aim of malware administrator 180 may be to install his malware on one or more computing devices 110 to cause them to operate as botnet zombies. As used throughout this Specification, malicious software ("malware") includes any virus, trojan, zombie, rootkit, backdoor, worm, spyware, adware, ransomware, dialer, payload, malicious browser helper object, cookie, logger, or similar designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Malware administrator 182 may operate C&C server 182, which may perform malware C&C functions as described herein.

Some or all of this malware may include a malware agent programmed to provide naked HTTP requests to avoid detection by services running on computing devices 110 and servers 140.

Servers 140 may be operated by a suitable enterprise to provide security updates and services, including anti-malware services. Servers 140 may also provide substantive services such as routing, networking, enterprise data services, and enterprise applications. In one example, servers 140 are configured to distribute and enforce enterprise computing and security policies. These policies may be administered by security administrator 150 according to written enterprise policies. Servers 140 may also provide a threat intelligence database. Security administrator 150 may also be responsible for administering and configuring servers 140, and all or a portion of network 170.

Other developers may also operate on network 170. Developer may not have malicious intent, but may develop software that poses a security risk. For example, a well-known and often-exploited security flaw is the so-called buffer overrun, in which a malicious user such as malware administrator 180 is able to enter an overlong string into an input form and thus gain the ability to execute arbitrary instructions or operate with elevated privileges on a computing device 110. Buffer overruns may be the result, for example, of poor input validation or incomplete garbage collection, and in many cases arise in nonobvious contexts. Thus, although not malicious himself, a developer may provide an attack vector for malware administrator 180. Applications may also cause inherent problems, such as crashes, data loss, or other undesirable behavior. In one particular example, a negligent developer may provide software that performs excessive naked HTTP requests.

Developers may host software on their own websites, or may upload software to an application repository 160. Because that software may be desirable itself, it may be beneficial for developers to occasionally provide updates or patches that repair vulnerabilities as they become known.

Application repository 160 may represent a Windows or Apple "app store," a Unix-like repository or ports collection, or other network service providing users 120 the ability to interactively or automatically download and install applications on computing devices 110. Legitimate developers and malware administrator 180 may both provide software via application repository 160. If application repository 160 has security measures in place that make it difficult for malware administrator 180 to distribute overtly malicious software, malware administrator 180 may instead stealthily insert vulnerabilities into apparently beneficial applications.

In some cases, one or more users 120 may belong to an enterprise. The enterprise may provide policy directives that restrict the types of applications that can be installed, for example from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions.

In another example, user 120 may be a parent of young children, and wish to protect the children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Collectively, any object that is a candidate for being one of the foregoing types of content, including botnet agents and other malware that contact malware C&C servers, may be referred to as "potentially unwanted content" (PUC). The "potentially" aspect of PUC means that when the object is marked as PUC, it is not necessarily blacklisted. Rather, it is may be considered suspicious, and a candidate for mitigation or remediation. Thus, it is a goal of users 120 and security administrator 150 to configure and operate computing devices 110 so as to usefully analyze PUC and make intelligent decisions about how to respond to a PUC object. This may include an agent on computing device 110, such as detection engine 224 of FIG. 2, which may communicate with servers 140 for additional intelligence. Servers 140 may provide network-based services, including server-side security engine 324 of FIG. 3 and a globalized threat intelligence database, that are configured to enforce policies, and otherwise assist computing devices 110 in properly classifying and acting on PUC.

Figure 2:
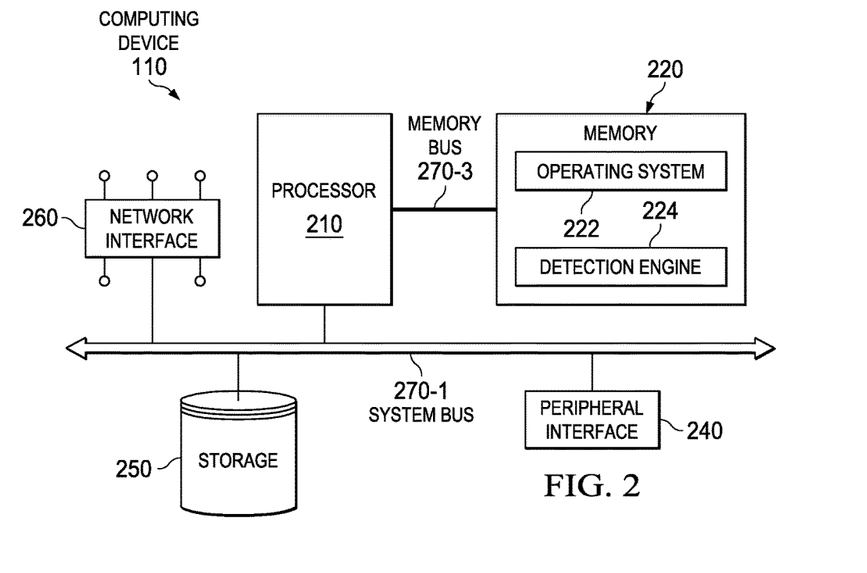
FIG. 2 is a block diagram of a computing device according to one or more examples of the present Specification.

FIG. 2 is a block diagram of computing device 110 according to one or more examples of the present Specification. Computing device 110 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data Computing device 110 includes a processor 210 connected to a memory 220, having stored therein executable instructions for providing an operating system 222 and detection engine 224. Other components of computing device 110 include a storage 250, network interface 260, and peripheral interface 240.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device, such as a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of detection engine 224. Many other configurations are also possible, and are intended to be encompassed within the broad scope of this Specification.

Network interface 260 may be provided to communicatively couple computing device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 4A:
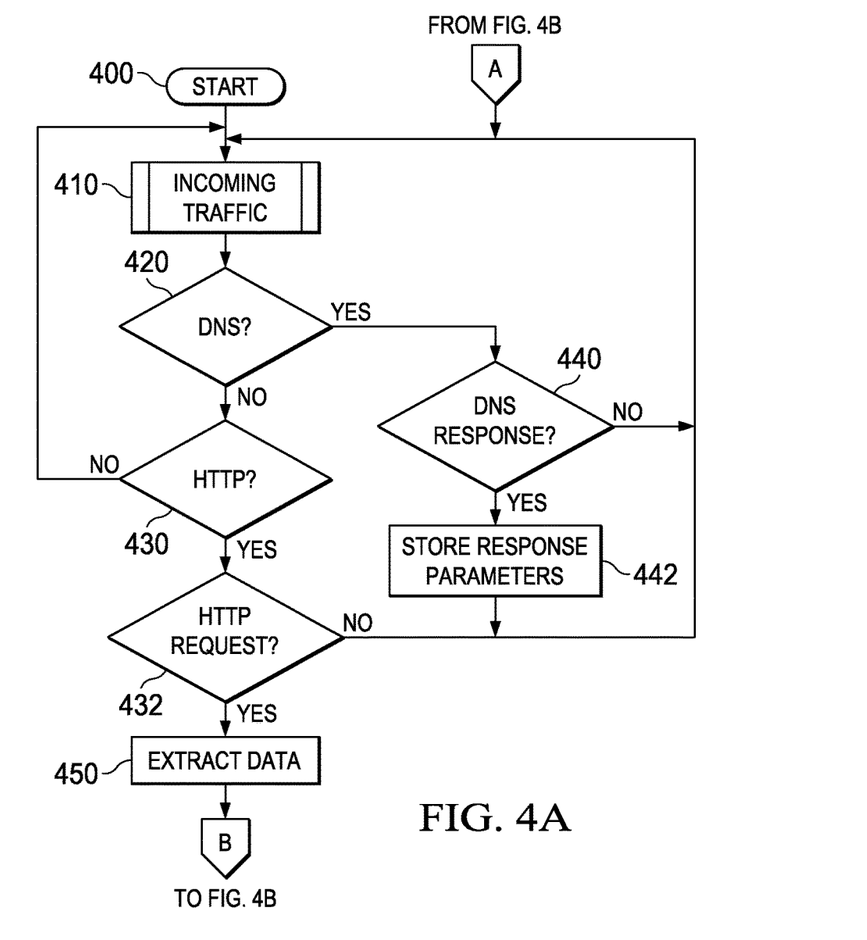
FIGS. 4A and 4B are a flow chart of a method performed by a client engine according to one or more examples of the present Specification.
Figure 4B:
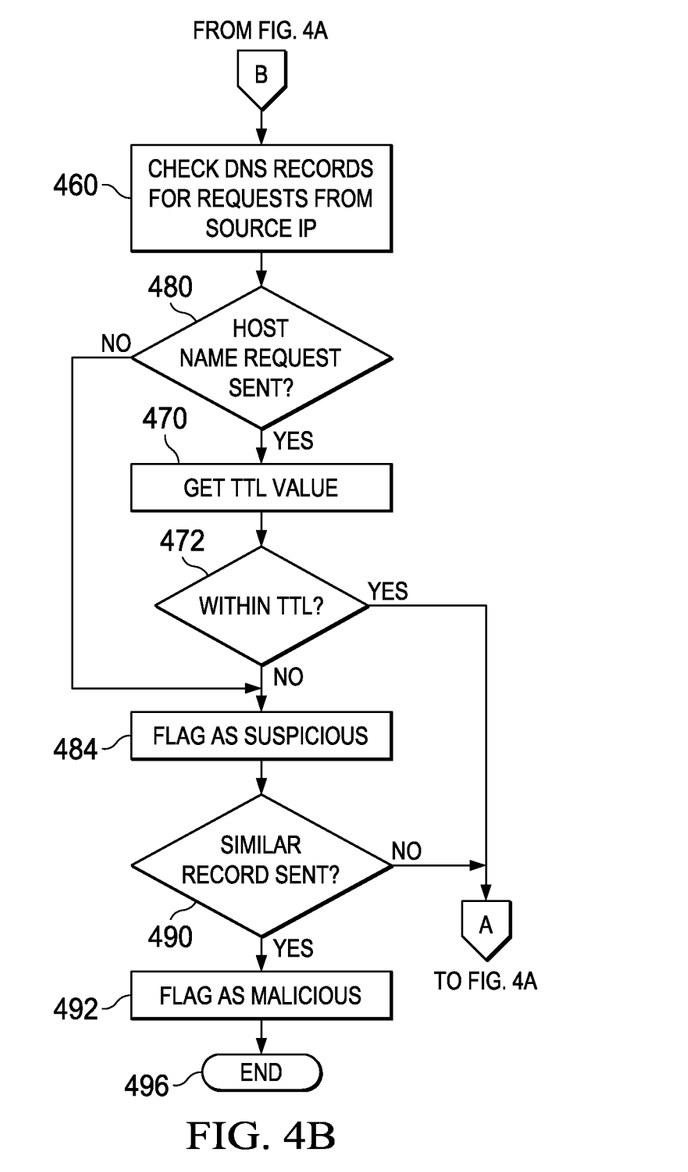

Detection engine 224, in one example, is a utility or program that carries out a method, such as method 400 of FIGS. 4A and 4B, or other methods according to this Specification. Detection engine 224 may be, in various embodiments, embodied in hardware, software, firmware, or some combination thereof. For example, in some cases, detection engine 224 may include a special integrated circuit designed to carry out a method or a part thereof, and may also include software instructions operable to instruct a processor to perform the method. In some cases, detection engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. It should also be noted that detection engine 224 is provided by way of non-limiting example only, and that other hardware and software, including interactive or user-mode software, may also be provided in conjunction with, in addition to, or instead of detection engine 224 to perform methods according to this Specification. In certain embodiments, detection engine 224 may also be a "low-level" process, or may execute with elevated system privileges, so as to enable it to inspect and classify network traffic without interference from malware agents or other processes. Detection engine 224 may use operating system "hooks" or similar methods to intercept resources, including network traffic.

In one example, detection engine 224 includes executable instructions stored on a non-transitory medium operable to perform method 400 of FIGS. 4A and 4B, or a similar method according to this Specification. At an appropriate time, such as upon booting computing device 110 or upon a command from operating system 222 or a user 120, processor 210 may retrieve a copy of detection engine 224 (or software portions thereof) from storage 250 and load it into memory 220. Processor 210 may then iteratively execute the instructions of detection engine 224.

Peripheral interface 240 may be configured to interface with any auxiliary device that connects to computing device 110 but that is not necessarily a part of the core architecture of computing device 110. A peripheral may be operable to provide extended functionality to computing device 110, and may or may not be wholly dependent on computing device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
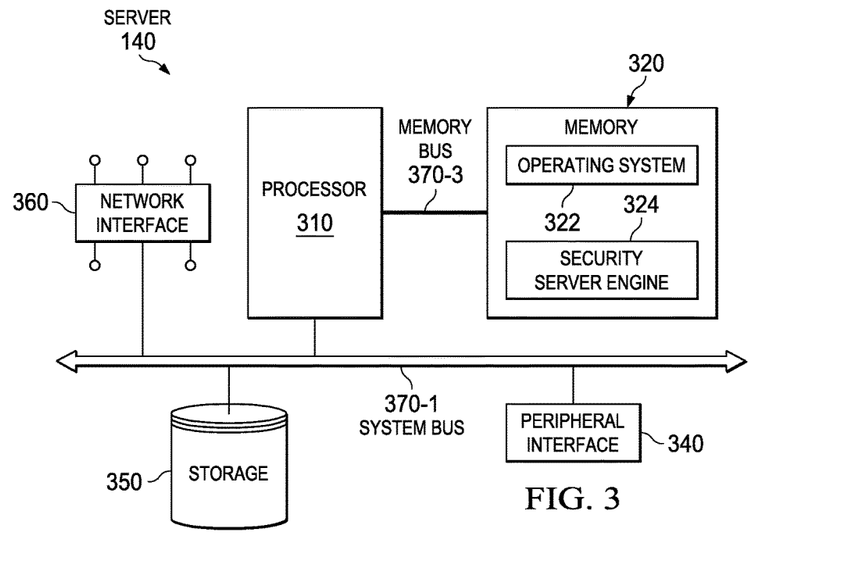
FIG. 3 is a block diagram of a security server according to one or more examples of the present Specification.

FIG. 3 is a block diagram of server 140 according to one or more examples of the present Specification. Server 140 may be any suitable computing device, as described in connection with FIG. 2. In general, the definitions and examples of FIG. 2 may be considered as equally applicable to FIG. 3, unless specifically stated otherwise.

Server 140 includes a processor 310 connected to a memory 320, having stored therein executable instructions for providing an operating system 322 and server-side security engine 324. Other components of server 140 include a storage 350, network interface 360, and peripheral interface 340.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or may be a non-DMA memory connecting via another bus, such as system bus 370. To simplify this disclosure, memory 320 is disclosed as a single logical block, but in a physical embodiment may include one or more blocks of any suitable volatile or non-volatile memory technology or technologies, as described in connection with memory 220 of FIG. 2. In certain embodiments, memory 320 may comprise a relatively low-latency volatile main memory, while storage 350 may comprise a relatively higher-latency non-volatile memory. However, memory 320 and storage 350 need not be physically separate devices, as further described in connection with FIG. 2

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server-side security engine 324. Many other configurations are also possible, and are intended to be encompassed within the broad scope of this Specification.

Network interface 360 may be provided to communicatively couple server 140 to a wired or wireless network.

Server-side security engine 324, in one example, is a utility or program that carries out methods according to this Specification. Server-side security engine 324 may be, in various embodiments, embodied in hardware, software, firmware, or some combination thereof. For example, in some cases, server-side security engine 324 may include a special integrated circuit designed to carry out a method or a part thereof, and may also include software instructions operable to instruct a processor to perform the method. In some cases, server-side security engine 324 may run as a daemon process, as described above. It should also be noted that server-side security engine 324 is provided by way of non-limiting example only, and that other hardware and software, including interactive or user-mode software, may also be provided in conjunction with, in addition to, or instead of server-side security engine 324 to perform methods according to this Specification.

In one example, server-side security engine 324 includes executable instructions stored on a non-transitory medium operable to perform methods according to this Specification. At an appropriate time, such as upon booting server 140 or upon a command from operating system 322 or a user 120, processor 310 may retrieve a copy of server-side security engine 324 (or software portions thereof) from storage 350 and load it into memory 320. Processor 310 may then iteratively execute the instructions of server-side security engine 324.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. In some cases, a peripheral may be a computing device in its own right. Peripherals may include, by way of non-limiting examples, any of the devices discussed in connection with peripheral interface 240 of FIG. 2.

FIGS. 4A and 4B provide a flow chart of a method 400 of a detection engine 224 performing malware agent detection according to one or more examples of the present Specification.

In block 410, detection engine 224 detects incoming traffic. In this context, "incoming" traffic refers to traffic that is incoming into network interface 260 in either direction. Thus, the traffic may be originating from within computing device 110, or maybe coming in from network 170. Detection engine 224 may run with elevated system privileges so that it has access to such traffic in at its lowest level.

In decision block 420, detection engine 224 determines whether the incoming traffic is DNS traffic.

If the incoming traffic is DNS traffic, then in decision block 440, detection engine 224 determines whether the traffic is a DNS response.

If the traffic is not a DNS response, then it is not of interest to certain embodiments of detection engine 224. In that case, control may pass back to start block 400.

Returning to block 440, if the incoming traffic is a DNS response, then in block 442, detection engine 224 stores response parameters from the DNS response packet. These response parameters may include, for example, a sender, a receiver, a domain name, an IP address, and a TTL field. After detection engine 224 has stored response parameters, control passes back to start block 400.

Returning to block 420, if the traffic is not DNS traffic, then in decision block 430, detection engine 224 determines whether the incoming traffic is HTTP traffic.

If the traffic is neither HTTP traffic nor DNS traffic (the "No" branch of block 430), then it is not of interest to certain embodiments of detection engine 224. Thus, control returns to start block 400.

Returning to block 430, if the traffic is HTTP traffic, then in decision block 432, detection engine 224 determines whether the incoming traffic is an HTTP request.

If the incoming traffic is not an HTTP request, then it is an HTTP response, and therefore is not of interest to certain embodiments of detection engine 224. Control therefore passes back to start block 400.

Returning to block 432, if the packet is an HTTP request, then in block 450, detection engine 224 extracts relevant data from the packet. This may include, for example, the parent process, the IP address, and the domain name. Control then passes through connector B to FIG. 4B.

In FIG. 4B, at block 460, detection engine 224 checks its DNS records for requests from the source IP of the packet. The source IP may have been extracted, for example, in block 450 of FIG. 4A.

In decision block 480, detection engine 224 determines whether an associated hostname request was previously sent for the domain name of the IP address the HTTP request is directed to.

If no DNS request was sent, then in block 484, the HTTP request, and its parent process as appropriate, may be flagged as suspicious. Control then proceeds according to the description below.

Returning to block 480, if a hostname request was sent, then in block 470, detection engine 224 retrieves the TTL value for the DNS request. This may have been stored, for example, in block 442.

In decision block 472, detection engine 224 determines whether the current HTTP request is within the TTL of its associated DNS request.

If the HTTP request is within the TTL, then the HTTP request and its parent process are not deemed suspicious, and control passes through connector A back to start block 400 of FIG. 4A.

Returning to block 472, if the HTTP request is not within the TTL of its associated DNS request—in other words, if this is a naked HTTP request because the TTL has expired without a new DNS request—then in block 484 the packet is flagged as suspicious. This represents a judgment that a single instance, or a very small number of instances, of a process sending naked HTTP requests may represent, for example, only a minor timing bug and may not be a reliable indicator that the process should be flagged as malware.

In decision block 490, detection engine 224 determines, according to an algorithm, whether one or more similar records has been sent. In other words, has the parent process sent one or more previous naked HTTP requests? The algorithm of block 490 may be a binary decision (any two or more naked HTTP requests, regardless of when they were sent, pass the condition), or may be a more detailed algorithm. For example, if the parent process has previously sent a naked HTTP request, but a DNS request has occurred in the interim, then the recurrence may be indicative of a timing issue rather than malware behavior. In other cases a threshold N may be designated, wherein if the number of naked HTTP requests is greater than N, the record is flagged as malware. Other inputs into the algorithm may be the number of previous naked HTTP requests, and the time between naked HTTP requests. By way of example, a large number of naked HTTP requests close together without any intervening DNS requests may be most likely to fit the profile of a malware agent. Other algorithms are also possible.

If the operative algorithm of block 490 determines that no (or insufficient) similar records have been sent, then control passes back through connector A to FIG. 4A and to start block 400.

Returning to block 490, if according to the algorithm of block 490, one or more, or enough, similar records have been sent, then in block 492, the packet and or its parent process may be flagged as malware. As discussed above, this need not represent an absolute certainty that the parent process and the packet are malware. Rather, they may represent a balance of probabilities, where the probability that a process is malware increases with each instance of a naked HTTP request, and especially with each consecutive instance of naked HTTP requests, while the probability that the process represents a professionally-developed and/or mission-critical application correspondingly decreases. Thus, the flagging of the parent process and packet as malware in block 492 represents a judgment call, and recognizes the real-world need to enforce security standards even in the face of some level of imperfect certainty.

In block 496, method 400 is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

Example Implementations

There is disclosed in an example 1, a computing apparatus, comprising: a network interface operable for connecting to a data network; and a detection engine comprising hardware and/or software operable for: inspecting a network packet provided on the network interface; identifying a domain name server (DNS) request associated with the network packet, the DNS request having a time-to-live; determining that the time-to-live of the DNS request is expired; and designating the network packet as suspicious. It should be noted that designating the network packet as malicious, for example, comprises designating the packet as suspicious, as suspicious packets are expressly considered a subset of malicious packets.

There is disclosed in an example 2, the computing apparatus of example 1, wherein the detection engine is further operable for designating a parent process of the network packet as suspicious.

There is disclosed in an example 3, the computing apparatus of example 1, wherein the detection engine is further operable for: determining that the packet belongs to a parent process that previously provided at least one other network packet with an expired DNS request; and designating the network packet as malware.

There is disclosed in an example 4, the computing apparatus of example 3, wherein the detection engine is further operable for designating the parent process as malware.

There is disclosed in an example 5, the computing apparatus of example 3, wherein determining that the network packet belongs to a parent process that has previously provided at least one other network packet with an expired DNS request comprises determining that the number of network packets with an expired DNS request is greater than a threshold greater than one.

There is disclosed in an example 6, the computing apparatus of example 3, wherein the detection engine is further operable for not designating the network packet as malware if the at least one other network packet with an expired DNS request occurred before an intervening DNS request.

There is disclosed in an example 7, the computing apparatus of example 3, wherein the detection engine is further operable for taking remediative action on the parent process.

There is disclosed in an example 8, the computing apparatus of example 3, wherein the detection engine is further operable for: determining that the parent process is designated on a whitelist; and taking no remediative action on the parent process.

There is disclosed in an example 9, the computing apparatus of any of examples 1-8, wherein the detection engine is further operable for notifying a security server of the network packet.

There is disclosed in an example 10, the computing apparatus of example 7, wherein the detection engine is further operable for receiving threat intelligence from the security server.

There is disclosed in an example 11, the computing apparatus of example 1, wherein the detection engine is further operable for classifying incoming traffic as one of DNS, hypertext transfer protocol (HTTP), and other traffic.

There is disclosed in an example 12, the computing apparatus of example 11, wherein the detection engine is further operable for ignoring traffic classified as other traffic.

There is disclosed in an example 13, the computing apparatus of example 1, wherein the detection engine is further operable for: detecting a DNS request; and storing response parameters for the DNS request.

There is disclosed in an example 14, one or more computer-readable mediums having stored thereon executable instructions for providing a detection engine operable for: inspecting a network packet; identifying a domain name server (DNS) request associated with the network packet, the DNS request having a time-to-live; determining that the time-to-live of the DNS request is expired; and designating the network packet as suspicious.

There is disclosed in an example 15, the one or more computer-readable mediums of example 14, wherein the detection engine is further operable for designating a parent process of the network packet as suspicious.

There is disclosed in an example 16, the one or more computer-readable mediums of example 14, wherein the detection engine is further operable for: determining that the network packet belongs to a parent process that has previously provided at least one other network packet with an expired DNS request; and designating the network packet as malware.

There is disclosed in an example 17, the one or more computer-readable mediums of example 16, wherein the detection engine is further operable for designating the parent process as malware.

There is disclosed in an example 18, the one or more computer-readable mediums of example 16, wherein determining that the packet belongs to a parent process that has previously provided at least one other network packet with an expired DNS request comprises determining that the number of network packets with an expired DNS request is greater than a threshold greater than one.

There is disclosed in an example 19, the one or more computer-readable mediums of example 16, wherein the detection engine is further operable for not designating the network packet as malware if the at least one other network packet with an expired DNS request occurred before an intervening DNS request.

There is disclosed in an example 20, the one or more computer-readable mediums of example 16, wherein the detection engine is further operable for taking remediative action on the parent process.

There is disclosed in an example 21, the one or more computer-readable mediums of example 16, wherein the detection engine is further operable for: determining that the parent process is designated on a whitelist; and taking no remediative action on the parent process.

There is disclosed in an example 22, the one or more computer-readable mediums of any of examples 14-21, wherein the detection engine is further operable for notifying a security server of the network packet.

There is disclosed in an example 23, the one or more computer-readable mediums of example 22, wherein the detection engine is further operable for receiving threat intelligence from the security server.

There is disclosed in an example 24, a method of detecting a malware agent, comprising: inspecting a network packet provided on the network interface; identifying a domain name server (DNS) request associated with the network packet, the DNS request having a time-to-live; determining that the time-to-live of the DNS request is expired; and designating the network packet and a parent process of the network packet as suspicious.

There is disclosed in an example 25, the method of example 24, further comprising: determining that the parent process has previously provided at least one other network packet with an expired DNS request; and designating the network packet and the parent process as malware.

There is disclosed in an example 26, a method comprising the performing the instructions disclosed in any of examples 14-23.

There is disclosed in example 27, an apparatus comprising means for performing the method of example 26.

There is disclosed in example 28, the apparatus of claim 27, wherein the apparatus comprises a processor and memory.

There is disclosed in example 29, the apparatus of claim 28, wherein the apparatus further comprises a computer-readable medium having stored thereon software instructions for performing the method of example 26.

What is claimed is:

1. A computing apparatus, implemented by a hardware processor and memory, for detecting behavior of a malware agent, comprising: a network interface operable for connecting to a data network; and one or more logic elements, including at least the hardware processor and memory, comprising a detection engine operable for: inspecting an HTTP request provided on the network interface; identifying a domain name server (DNS) request associated with the HTTP request, the DNS request having a time-to-live; determining that the time-to-live of the DNS request is expired; designating the HTTP request as suspicious based at least in part on the expiration of the DNS request; and determining that the DNS request occurred before an intervening DNS request, and designating the HTTP request as not malware; wherein the detection engine is further operable for designating a parent process of the HTTP request as suspicious.

2. The computing apparatus of claim 1, wherein the detection engine is further operable for designating the parent process as malware.

3. The computing apparatus of claim 1, wherein the detection engine is further operable for taking remediative action on the parent process.

4. The computing apparatus of claim 1, wherein the detection engine is further operable for: determining that the parent process is designated on a whitelist; and taking no remediative action on the parent process.

5. The computing apparatus of claim 1, wherein the detection engine is further operable for notifying a security server of the HTTP request.

6. The computing apparatus of claim 5, wherein the detection engine is further operable for receiving threat intelligence from the security server.

7. The computing apparatus of claim 1, wherein the detection engine is further operable for classifying incoming traffic as one of DNS, hypertext transfer protocol (HTTP), and other traffic.

8. The computing apparatus of claim 7, wherein the detection engine is further operable for ignoring traffic classified as other traffic.

9. The computing apparatus of claim 1, wherein the detection engine is further operable for: detecting a DNS request; and storing response parameters for the DNS request.

10. One or more non-transitory computer-readable mediums for detecting behavior of a malware agent having stored thereon executable instructions for providing a detection engine operable for: inspecting an HTTP request; identifying a domain name server (DNS) request associated with the HTTP request, the DNS request having a time-to-live; determining that the time-to-live of the DNS request is expired; designating the HTTP request as suspicious based at least in part on the expiration of the DNS request; and determining that the DNS request occurred before an intervening DNS request, and designating the HTTP request as not malware; wherein the detection engine is further operable for designating a parent process of the HTTP request as suspicious.

11. The one or more computer-readable mediums of claim 10, wherein the detection engine is further operable for designating the parent process as malware.

12. The one or more computer-readable mediums of claim 10, wherein the detection engine is further operable for taking remediative action on the parent process.

13. The one or more computer-readable mediums of claim 10, wherein the detection engine is further operable for: determining that the parent process is designated on a whitelist; and taking no remediative action on the parent process.

14. The one or more computer-readable mediums of claim 10, wherein the detection engine is further operable for notifying a security server of the HTTP request.

15. The one or more computer-readable mediums of claim 14, wherein the detection engine is further operable for receiving threat intelligence from the security server.

16. A computer-implemented method of detecting behavior of a malware agent, comprising: inspecting an HTTP request provided in a network packet received on a network interface; identifying a domain name server (DNS) request associated with the HTTP request, the DNS request having a time-to-live; determining that the time-to-live of the DNS request is expired; designating the HTTP request and a parent process of the network packet as suspicious based at least in part on the expiration of the DNS request; and determining that the DNS request occurred before an intervening DNS request, and designating the HTTP request as not malware; designating a parent process of the HTTP request as suspicious.

17. The method of claim 16, further comprising: determining that the parent process has previously provided at least one other HTTP request with an expired DNS request; and designating the network packet and the parent process as malware based at least in part on the determining.

* * * * *